United States Patent [19]

Castellani et al.

[11] 4,102,756

[45] Jul. 25, 1978

[54] NICKEL-IRON (80:20) ALLOY THIN FILM ELECTROPLATING METHOD AND ELECTROCHEMICAL TREATMENT AND PLATING APPARATUS

[75] Inventors: Eugene Evans Castellani, Putnam Valley; John Vincent Powers, Shenorock; Lubomyr Taras Romankiw, Briarcliff Manor, all of N.Y.

[73] Assignee: International Business Machines Corporation, Armonk, N.Y.

[21] Appl. No.: 755,893

[22] Filed: Dec. 30, 1976

[51] Int. Cl.² .................... C25D 3/56; C25C 1/24; C25D 21/14
[52] U.S. Cl. .................. 204/43 T; 204/123; 204/239; 204/273; 204/274
[58] Field of Search .............. 204/237, 239, 43 T, 204/273, 274, 123

[56] References Cited

U.S. PATENT DOCUMENTS

| | | | |
|---|---|---|---|
| 3,317,410 | 5/1967 | Croll et al. | 204/239 X |
| 3,434,956 | 3/1969 | Glenn | 204/237 |
| 3,442,774 | 5/1969 | Mehaute et al. | 204/43 T X |
| 3,649,509 | 3/1972 | Morawetz et al. | 204/238 |

Primary Examiner—J. H. Mack
Assistant Examiner—D. R. Valentine
Attorney, Agent, or Firm—Graham S. Jones, II

[57] ABSTRACT

A thin film of low magnetostriction Permalloy 80% nickel − 20% iron ± 1% is electroplated in a bath having a ratio of about 1.8:1 to 24:1 g/liter ratio of Ni to Fe ions with a plating current density from 10 ma/cm² − 200 ma/cm² when plating in sheet form or an Ni/Fe ratio of 25:1 to 85:1 with a current density of 2 ma/cm² − 110 ma/cm² when plating through a mask. The fluid in the system is constantly mixed, replenished with fresh iron, acid, and other reagents, is adjusted in temperature and subjected to a continuous laminar regime of mixing. Fresh solution is added to the bath from a reservoir where the above adjustments are made. The inlet for the fresh solution is at the lower end of the plating chamber and directed at a bath mixer which includes a slot through which the fresh solution is directed to optimize mixing in the plating chamber. Complexing agents are avoided. High speed plating is obtained with about 24.4 g/l of $Ni^{++}$, 1.05 g/l of $Fe^{++}$, 25 g/l of $H_3BO_3$, 0.2 g/l of Na saccharin and a pH of 1.5 to 3.6.

26 Claims, 10 Drawing Figures

NICKEL-IRON (80:20) ALLOY THIN FILM ELECTROPLATING METHOD AND ELECTROCHEMICAL TREATMENT AND PLATING APPARATUS

BACKGROUND OF THE INVENTION

1. Field of the Invention

This invention relates to chemistry, involving electrical energy and more particularly, electrolytic cell apparatus with an agitator and a solution controlling system.

2. Description of the Prior Art

U.S. Pat. No. 3,652,442 of Powers et al entitled "Electroplating Cell Including Means to Agitate the Electrolyte in Laminar Flow" shows a bath container including a reciprocating arm with a stirring paddle composed of a base portion triangular in cross-section with sharp edges facing forward and back to minimize turbulence and an apex in the center pointing upwardly which is relatively blunt. A transverse member is spaced above the base portion having an inverted form of the same cross-section so the base member and the transverse member define a slot through which the fluid near the base of the bath container can pass as the paddle is reciprocated back and forth across the base of the container to stir the electrolyte. However, this patent does not provide any means for circulating or replenishing the bath. The patent describes a bath with 109 g/l of $NiCl_2.6H_2O$, 3.88 g/l of $FeCl_2.4H_2O$, 12.5 g/l $H_3BO_3$, 0.4 g/l Na Lauryl Sulfate, and 0.5 g/l saccharin, in a magnetic field of 40 Oe at a bath temperature of 20° C by means of the continuous plating technique with continuous agitation with the paddle, for plating a flat sheet. With respect to the above formulation, for plating a flat sheet, the nickel-to-iron ratio of ions is believed to be excessive. On the other hand, the plating rate for deposition into photoresist mask defined patterns is not defined at all.

U.S. Pat. No. 3,317,410 of Croll et al for "Agitation System for Electrodeposition of Magnetic Alloys" shows a plating system with continuous circulation of fluid and temperature control, where the solution impinges at right angles onto the cathode, which is uniform for very small areas only.

U.S. Pat. No. 3,649,509 of Morawetz et al for "Electrodeposition Systems" includes means for recycling fluid through a conduit into which heat, acid and specific gravity additives are applied. The system includes no paddle and the fluid is admitted far from the substrate to be plated. Measurement is automatic and continuous, but adjustment is manual and intermittent. However, it states at Col. 2, line 24, "The meters can be by-passed and an electric signal can be applied to a control unit . . . to automatically vary the composition or the temperature of the plating solution." This is a rather vague teaching of an objective or goal rather than an embodiment, since no means for providing automatic control is shown. Furthermore, manual adjustment is unreliable, requires labor and there may be a long response time in comparison to the plating time, and there may be resulting large fluctuations in solution temperature, pH and specific gravity. Also, specific gravity is not a correct measure of the rate of consumption of reagents comprising the alloy being plated and, in particular, of iron which is the most sensitive reagent in terms of maintaining a constant quantity level.

U.S. Pat. No. 3,505,547 of Ambrosia et al teaches a bath for depositing Permalloy alloys in which $Fe^{++}$ ions are in a concentration in the range of $10^{-3}$ to $5 \times 10^{-2}$ mole per liter and Ni ions are in a concentration of $10^{-1}$ to $5 \times 10^{-1}$ mole per liter, such as 0.2 mole (52 grams) $NiSO_4$, and 0.2 mole (55 grams) $FeSO_4$ per liter. In another example, it teaches use of 0.4 mole (105 grams) $NiSO_4$ and 0.1 mole (27.8 grams) $FeSO_4$. In still another case, 0.4 mole (105 grams) $NiSO_4$ and 0.2 mole (55 grams) $FeSO_4$ are provided. In each case, 10 grams of $H_3BO_3$ were used along with metallic ion additives with negative deposition potentials such that they do not codeposit in an amount of $10^{-4}$ to $10^{-2}$ mole per liter. The pH is from 1.3 to 7.

U.S. Pat. No. 3,716,464 of Kovac et al teaches a method of electrodepositing Ni-Fe (80-20) alloys. It also teaches use of a $NiSO_4$ and $FeSO_4$ solution with concentration levels such as 20/80 and 5/95 (1/19) of (Fe/Ni) sol. with about 0.3417 g/l of $Fe^{++}$ and 6.72 g/l of $Ni^{++}$ (based on $NiSO_4.6H_2O$ = 30 g/l and $FeSO_4.7H_2O$ = 1.7 g/l, with I peak = 15 ma/cm² and with a maximum plating rate of 125 Å/min. The pH is 3.0 at 25° C and 10 g/l of NaK-tartrate is used as a complexing agent.

In a publication by Bartelson et al entitled "Electrodeposition of Ni-Fe Films," a solution of 25–60 g/l of $Ni^{++}$ as nickel sulfamate, 1–3 g/l of $Fe^{++}$ as ferrous ammonium sulfate, 25 g/l of boric acid, 1 g/l of saccharin, 0.5 g/l of sodium lauryl sulfate, pH 3.7–3.0, temperature 25°–30° C, cathode current density 4.3–8.6 ma/cm². However, the sulfamate ion is a complexing agent which complexes both nickel and iron.

SUMMARY OF THE INVENTION

In accordance with this invention a nickel-iron electroplating system is provided including cell means for containing a plating bath, an anode, a cathode to be plated with a nickel-iron alloy comprising on the order of 20% iron, ± about 1%. The cell includes first and second vertical end walls, means for holding a wafer to be plated in the cathode of the cell with the surface to be plated supported facing the anode. A reciprocable mixer is provided for agitation without substantial turbulence supported by bearing means for providing longitudinal stirring action by reciprocation between the end walls cyclically over the surface of the cathode. The mixer includes a pair of confronting transverse blocks having a substantial slot therebetween. Each block has a symmetrical wedge shape with substantial opening defined between the blocks. The blocks have sharp edges facing the directions towards which the blade is adapted to reciprocate. An inlet to the cell exists in one of said end walls aligned with the cathode surface whereby the inlet is adapted to pass fluid through the slot directly onto the surface of one end of the cathode. A reservoir for electrolyte is provided having an outlet connected by conduit means to the inlet, and there is means for pumping fluid up from the reservoir into the inlet via the conduit means. An outlet from the cell at an upper portion thereof high above the base of the cell has a second conduit means for carrying electrolyte into the reservoir. Preferably, a thermostatic control, a temperature sensor and heating means are connected to the reservoir for maintaining the reservoir substantially at 25° C. A pH sensor and a dispenser for dilute acid and an $Fe^{++}$ ion are provided for dispensing the acid and the ion through a valve into the reservoir. Stirring means is provided in the reservoir for maintaining a uniform set of temperature, pH, iron ion and related conditions. For high speed plating, the electrolyte comprises about 24.4 g/l of $Ni^{++}$, 1.05 g/l of $Fe^{++}$, 2.5 g/l of $H_3BO_3$, 0.2 g/l of Na Saccharin, and a pH of 1.5 – 3.6 with a current density from 5 – 200 ma/cm$^2$. Further in accordance with this invention, a thin film of low magnetostriction Permalloy alloy 80% nickel — 20% iron ± 1% is electroplated in a bath having a ratio of about 1.8:1 to 24:1 g/liter ratio of Ni to Fe ions with an overall plating current density of 5 ma/cm$^2$ when plating through a mask. Complexing agents are avoided.

In prior practice in which a Permalloy alloy film is plated over a cathode which has recesses and raised areas, or when it is necessary to plate a Permalloy alloy film through a resist mask, the strong composition dependence upon small current density variation is extremely undesirable. For instance, U.S. Pat. No. 3,853,715 tries to minimize this problem by introducing narrow nonplated frames around each pattern. While useful for large dimension patterns, the solution given in the above-mentioned patent is impractical in the case of very small patterns such as the T and I bars in a bubble memory. Heretofore, the nickel:iron ratio in baths has been 80:1, and the film composition has been strongly dependent on the current density. In addition, the plating rate was so high that it became difficult to control. Prior baths are very sensitive to small variation in temperature, pH, iron concentration as well as small variation in the conditions used for agitation.

DESCRIPTION OF A PREFERRED EMBODIMENT

Figure 1:
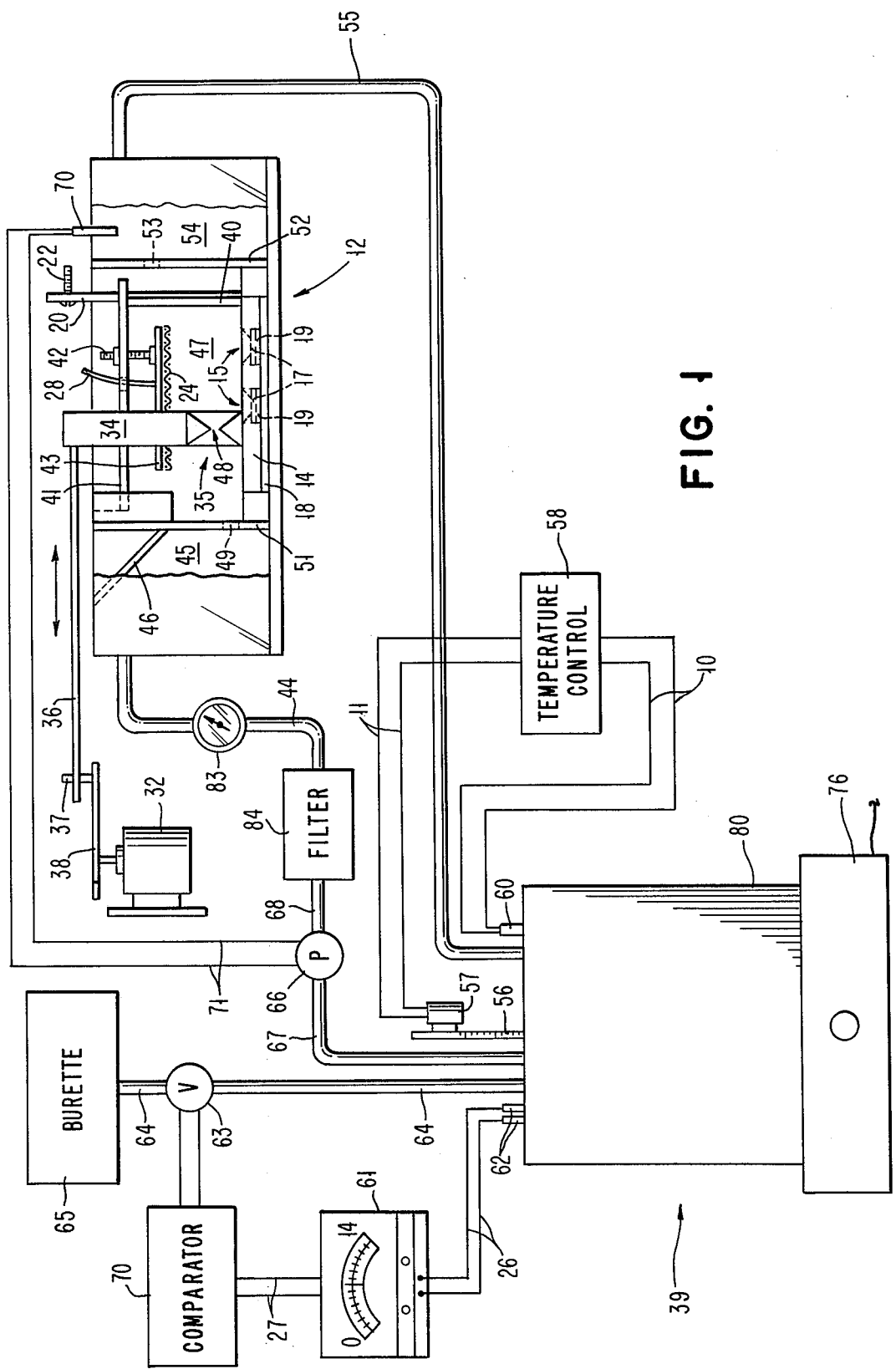
FIG. 1 shows a schematic diagram of a plating system in accordance with this invention.

FIG. 1 shows apparatus adapted for practising this invention. The plating of nickel-iron alloys is performed in container 12. The walls are composed of a dielectric material such as glass or a plastic such as polymethacrylate. A cathode 14 is composed of a metal plate having platers tape composed of an insoluble polymer adhesively secured to the exterior thereof on the edges and lower surface to protect it from the electroplating bath and thus giving a very ill defined current density and current density distribution. Cathode 14 includes apertures 15 having countersinks not exceeding 0.025 inch and preferably only 0.010 inch thickness on the tops and counterbores on the bottom into which discs of a substrate 17 to be plated are inserted and supported on elastomeric discs 19. Discs 19 hold discs 17 in firm contact with cathode 14 to permit electrical current to flow through the contact between them. Substrate materials 17 which have been found appropriate include 1¼ inch diameter sapphire, garnet, various ceramics or Si wafers covered with thermal $SiO_2$ and metallized with 50Å to 200Å of Ti and 100Å to 1000Å of Cu, Permalloy alloy, Au, etc.

Cathode 14 is secured by screws to a dielectric material base 18 which holds discs 19 in place, recessed not more than 0.0025 in. from the top surface of the cathode. Base 18 rests upon the bottom of container 12. Electrical contact to cathode 14 is provided by brass support post 20 which is fastened to cathode 14. Post 20 is covered with platers tape to insulate it wherever it is immersed in the electroplating bath, when container 12 is filled. Post 20 is connected at terminal 22 to a source of electrical current, not shown.

Anode 24 is composed of wire mesh screening, and it is supported by an insulated frame including upright polymethacrylate block 40, horizontal block 41, bolts 42, and polymethacrylate block 43. Anode 24 is composed of inert platinum, solid nickel or of a combination of an inert Pt sheet and a Ni wire mesh. Terminal metal strip 28 is connected at one end to anode 24.

Figure 2:
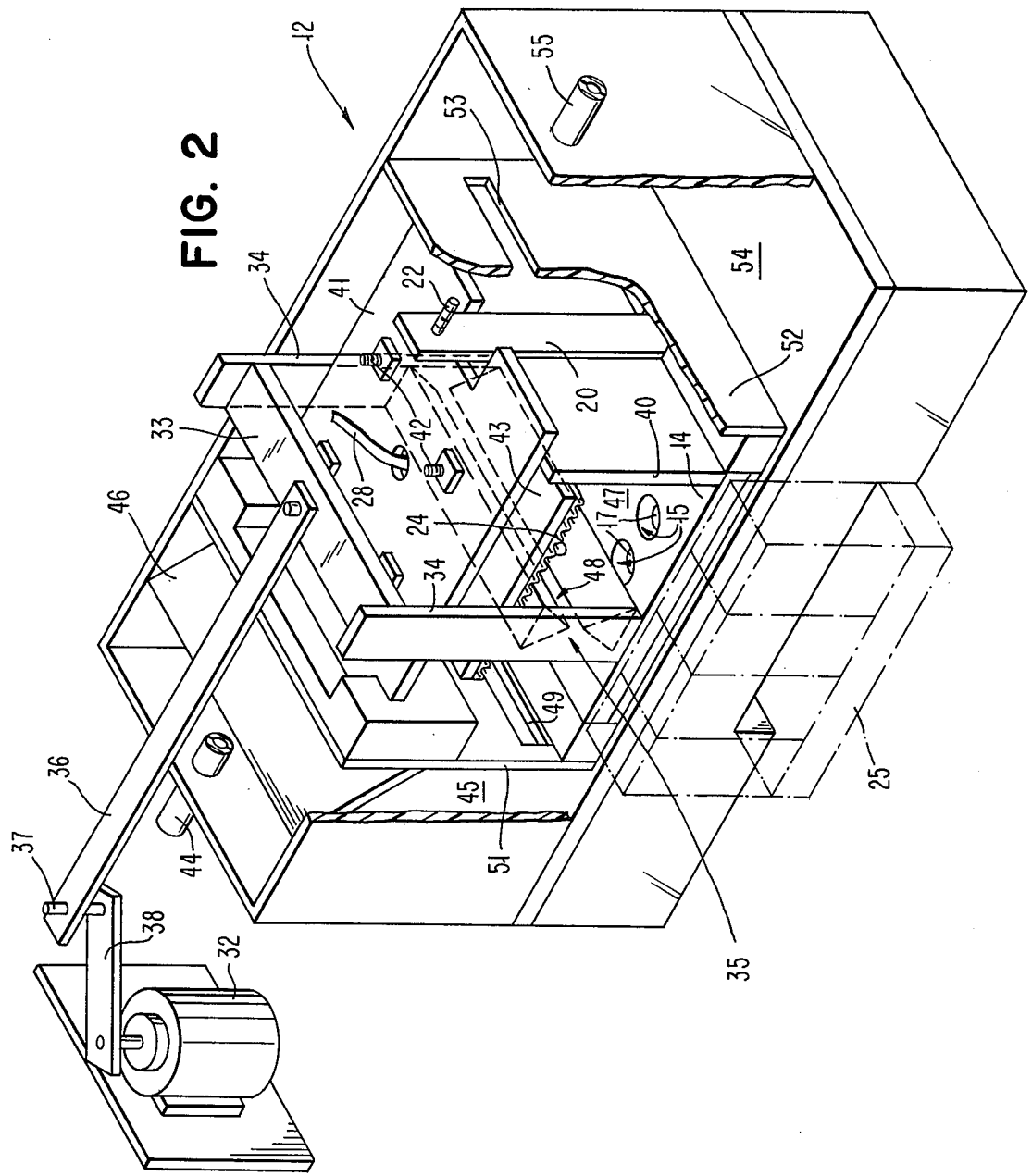
FIG. 2 shows a partially cut away perspective view of the plating cell of FIG. 1.

The bath level during plating is above anode 24, so anode 24 is immersed in the bath during plating. The bath is constantly replenished and its temperature is controlled by recirculation from a reservoir 39 where it is refreshed by dispensing acid, iron and preferably also Na Saccharin, Na lauryl sulfate and/or [$Ni^{++}$] if needed and constantly stirred by a reciprocating mixer 35 otherwise referred to herein as a paddle, which travels back and forth above the surface of cathode 14 at an approximate distance of 1/32 to ⅛ inch for providing agitation of the bath with minimal turbulence. The mixer 35 is carried by upright arms 34 which are secured at their top ends to transverse member 33 (FIG. 2) which is secured at the center to link arm 36 which is secured by pin 37 to crank 38 which is secured to rotate about the shaft of the electric motor 32. When motor 32 is energized, the arm 36 drives mixer 35 back and forth with simple harmonic reciprocal motion at a substantially uniform rate near the center of container 12 where the substrates 17 are located. In addition, fresh electroplating bath fluid is pumped into container 12 from reservoir 39 by means of tubes 67 and 68, self-priming, positive displacement pump 66, filter 84, and tube 44. Filter 84 filters out particles of 1 micron size and above, preferably. When fresh bath enters container 12, it is introduced into weir 45 containing a baffle 46 for diverting the bath fluid down towards elongated transverse inlet 49 through wall 51 separating weir 45 and plating cell 47. The mixer 35 is composed of two horizontal transverse blades forming a slot 48 between them which is close to horizontal alignment with inlet 49. The inlet 49 is preferably aligned to direct fluid directly onto the upper surface of cathode 14 to supply the fresh solution directly to the substrates 17. Each of the two transverse blades has a symmetrical wedge shape with sharp opposing edges facing towards end walls 51 and 52 of plating cell 47. There are also two confronting points of the blades which define the slot 48. As a result of reciprocation of the blades of mixer 35, the bath solution near the cathode is mixed thoroughly with a substantially laminar flow having little turbulence to avoid nonuniform polarization, while minimizing the formation of a depletion zone which could lead to formation of an iron hydroxide precipitate with too high a pH and hydrogen evolution at the cathode and avoids [Fe$^{++}$] depletion near the cathode since the solubility product of [Fe$^{++}$].[OH$^-$]$^2$ has much lower solubility than the solubility product [Ni$^{++}$].[OH$^-$]$^2$. In addition, it is necessary to mix the solution to minimize pitting cause by the formation of H$_2$ bubbles in identically the same spots on the surface of the cathode at all times during electrolysis. The sharp edges of the transverse blocks facing end walls 51 and 52 of cell chamber 47 reduce turbulence by providing minimal resistance to flow. The triangular cross-section of the blades of mixer 35 provides the set of confronting blunted apexes over which fluid flows with a flat base. In stirring, the fluid is forced to flow through slot 48 between the two blocks and over the upper block to mix with the bulk of the solution in cell 47. As the mixture passes through slot 48, laminar flow at the cathode surface is restored. The fluid entering via inlet 49 passes immediately through slot 48 when mixer 35 in near end wall 51, and then the fresh fluid is carried along with mixer 35 as it moves towards end wall 52.

The current path through the plating bath has a cross-sectional area substantially equal to the cross-sectional area of cathode 14 and anode 24, i.e., the current across the electrodes 14 and 24 is confined to the boundaries thereof and is not allowed to diverge or spread in its path between said electrodes 14 and 24. As a result, the current density is relatively constant throughout the whole cathode area 14. The current density is found to be relatively uniform and well defined; and the current density value can be predicted at any point on the cathode 14, since they are the same at any given point thereon. Consequently, films produced in the electroplating cell of this invention are uniformly thick throughout, and where metal alloys are being plated, the metal compositions which are normally a very strong function of the local current density will also be uniform over the entire film.

Figure 3:
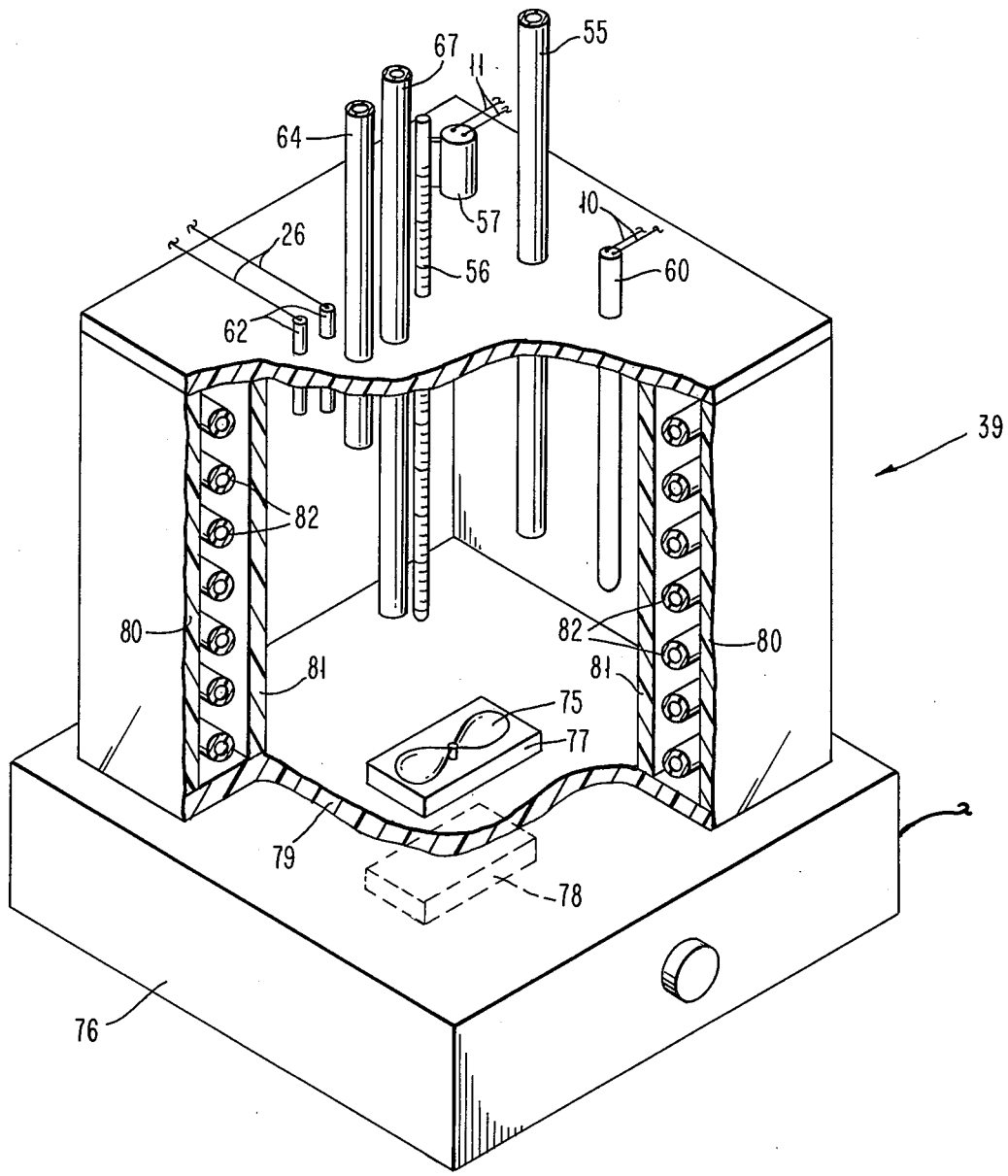
FIG. 3 shows a perspective view of the reservoir of FIG. 1, partially cut away.

When the bath leaves plating cell 47, it passes into outlet weir 54 through slot 53 in wall 52 up above anode 24. A fluid level sensor 70 in weir 54 is connected by wires 71 to the operational controller portion of pump 66. Weir 54 is connected via outlet tube 55 to return the fluid by gravity from weir 54 to reservoir 39 for treatment, (see FIG. 3).

There temperature is controlled by an expanded scale mercury thermometer 56 read by a capacitive sensor 57 such as a Thermowatch unit made by I$^2$R company which signals temperature control 58 via wires 11 to operate a quartz encapsulated heating element 60 immersed in fluid in reservoir 39 and connected electrically to control 58 via wires 10. In addition, pH meter 61 is connected by wires 26 to sensors 62 which sense the pH in the solution. The pH meter 61 is connected by wires 27 to comparator 70 which is connected to operate a valve 63 to permit a solution of Fe$^{++}$ ions and dilute HCl contained in burette 65 to flow through tubes 64 into reservoir 39, as required. A stirring mechanism is included within the reservoir 39 in the form of a magnetically driven propeller or stirrer 75 connected by magnetic drive comprising a set of permanent bar magnets 77 and 78 located respectively above and below the base 79 of reservoir 39. Magnet 78 is located within control unit 76 which provides variable speed control of turning of magnet 78. Alternatively a non-contaminating mechanical stirrer can be used.

The temperature in reservoir 39 is maintained preferably at from 25° - 30° C. Fluid jacket walls 80 and chamber inner walls 81 form a space filled with fluid which is further temperature controlled by pumping fluid through tubing 82 wrapped about walls 81 by means of a circulator pump, not shown, in order to maximize temperature uniformity. The cooling coils can also be inserted directly into the reservoir tank providing they are noncontaminating and providing they do not interfere with regular agitation of the bath. The precise temperature used is less important than uniformity in order that the yield of the films produced will be quite uniform.

A flowmeter 83 is connected in series with tube 44 to monitor the rate of flow from pump 66 into weir 45 because the rate of recirculation is in part a measure of the rate of agitation resulting from the solution being forced into the cell via the thin, wide, slot-shaped inlet 49.

BATH AND PROCESS

Batch-fabricated, magnetic bubble devices and magnetic recording thin film heads utilize Permalloy films which are in the range of 2000Å to 10,000Å thick for bubble devices and 5000Å to 50,000Å (0.5 to 5 μm) thick for recording heads. Most of these fabrication processes require for the films to be plated in 2000Å to 10,000Å steps in bubble devices and up to 2 to 8 μm high steps in recording head devices. Films must also be plated over cathodes in which some areas are blocked off with photoresist. The vertical steps and blocked-off areas with resist introduce local current density variations. Such local current density variations result in local composition and thickness differences.

For the electroplating process to be commercially useful in fabrication of magnetic bubble devices and magnetic recording heads, the plating rate of the film should be reasonably high, but not uncontrollably high (local current density equivalent to 5 ma/cm$^2$ to 120 ma/cm$^2$). For practical and economical reasons, it should be possible to plate a 500Å to 5 μm thick film in 2 to 30 minutes. The film composition should vary much less as a function of current density that it does for prior art baths used for plating of 200 Å to 2,000 Å films, used for plated random access thin film memories such as flat film or coupled magnetic film memories.

High plating rate baths have been developed for fabrication of plated magnetic wire memories. The Permalloy film thickness on the wires is typically 5,000 Å to 10,000 Å thick. The prior art form of agitation used has been forced flow agitation with impingment which is usually very highly turbulent. Due to the nature of the wire fabrication process, these films have to be plated in 1 to 8 minutes of the wire residence time in the plating cell. Although some of these baths are known, the literature available lacks important details about the baths, cell design or the exact plating conditions.

The high plating rate Permalloy bath described below is adapted for the purpose of fabrication of thin film magnetic bubble devices and recording heads. Optimum plating conditions are described. The described plating bath satisfies the current magnetic film property requirements for fabrication of such products. Despite this, certain further improvements in control of various plating parameters and in magnetic properties are being sought.

MAGNETIC FILM PROPERTY REQUIREMENTS FOR FABRICATION OF THIN FILM BUBBLE DEVICES AND RECORDING HEADS

It is necessary that the films used in fabrication of recording heads are magnetically anisotropic. Magnetic anisotropy permits use of rotational switching to improve the frequency response of the devices. Although it is desired to have a square easy axis loop with a low remanence, the exact value of the coercive force $H_c$ is not critically important. It is preferred, however, that $H_c$ be below 0.8 Oe. The exact value of the easy axis dispersion $\alpha$, and skew $\beta$, are also not critically important for the proper operation of the device. The important magnetic parameters affecting the signal output of the device are: hard direction remanence, saturation magnetization $M_s$, initial permeability $\mu$, and electrical resistivity of the film $\rho$.

High resistivity is particularly important for heads to be operated at high frequencies. Since the read signal depends on all four quantities enumerated above, it is desired to minimize the hard direction remanence and to maximize each of the last three quantities. Furthermore, since $\mu_i$ is proportional to $M_s/H_k$, in order to maximize $\mu_i$, it is desired to minimize the anisotropy field $H_k$, while retaining the magnetic orientation of the film.

EXPERIMENTAL APPARATUS AND PROCEDURES

The basic composition of the plating bath and the plating conditions are shown in Table I. The electroplating cell used in developing and optimizing this bath consists of the rectangular Lucite (polymethacrylate) container enclosing the cell of FIGS. 1 and 2 in which the bottom of the cell represents the cathode and the top of the cell represents the anode. The anode-cathode arrangement can be reversed or placed on its side so long as the mixer or paddle agitator 35 and the inlet slot 49 facilitating the mixing and entry of the fresh solution respectively are also suitably rotated (such that agitation and refreshing of the cathode surface is continuously maintained). Both the anode 24 and the cathode 14 fill the cell 47 substantially from wall to wall in each direction. This arrangement results in a uniform primary current distribution over the whole cathode area. All films for recording head devices are plated in a 40 Oe magnetic field provided by permanent magnets 25 shown in phantom in FIG. 2. After plating, all films are annealed for 2 hours at 200° C in a 40 Oe easy axis field. Subsequently, they can be additionally annealed for 2 hours at 200° C in the absence of a magnetic field or for 2 hours at 200° C in a cross-field or both. The static magnetic properties of the films are measured before annealing, after easy-axis annealing and after the annealing in absence of the field and/or the cross-field when it is used.

The static magnetic properties of the films, coercive force $H_c$, anisotropy field $H_k$, easy axis dispersion plus skew, $\alpha + \beta$, and magnetostriction $\lambda_s$ are measured using a 60-cycle inductive B-H loop tester. The magnetic moment, $M_s$, of several films was measured using a force magnetometer. Currently, each sample is compared on a B-H loop tester with a standard sample. The initial permeability $\mu_i$ of each sample is measured. The electrical resistivity $\rho$ of the films is measured using a four-point probe.

The film thickness is evaluated from the weight gain of the sample during plating and from a profilometer measurement. The film thickness is subsequently verified using an X-ray fluorescence and/or a wet chemical technique. The film composition is also determined using the X-ray fluorescence technique or a wet chemical technique, using the orthophenanthratin method for iron and dimethylglyoxime for nickel analysis.

DISCUSSION OF PLATING PARAMETERS AND THEIR EFFECT ON FILM COMPOSITION AND MAGNETIC PROPERTIES

The following plating parameters were investigated:
a. Current density.
b. pH and the rate of change of pH during plating.
c. Temperature and the rate of change of temperature during plating.
d. Agitation (height of the paddle over the cathode at a fixed rate of travel of the paddle).
e. Operation of the apparatus with recirculation agitation only and no paddle movement and operation of the cell with no recirculation and with paddle agitation only. Operation with both paddle movement and recirculation.
f. Speed of movement of the paddle in presence and in absence of recirculation.
g. Change of [Fe$^{++}$] ion content of the bath and the rate of consumption of the [Fe$^{++}$] ion during plating.
h. Partial and/or complete substitution of chloride ion by sulfate and by fluoride ions.
i. Change in sodium saccharin content.
j. Type of anode (inert Pt, soluble Ni, and mixed Ni-Pt).
k. Addition of cobalt sulfate to the bath.

Because of the preferential electrodeposition of iron in presence of nickel, most of the commercial (80/20) Permalloy electroplating baths are operated with a high nickel-to-iron ratio in solution. (I. W. Wolf, Electrochem. Technology, pp. 164–7, 1, No. 5–6, 1963; W. O. Frietag, J. S. Mathias, Electroplating and Metal Finishing, pp. 42–47, February, 1964; and T. R. Long, J. Appl. Physics, 31, Suppl. 5, 1960.)

In the baths described in the first two references, the films are plated at very low current densities ($\simeq$5 ma/cm$^2$) and therefore it takes 20 to 30 minutes to deposit a 0.5 to 1$\mu$m film. In addition, the composition of the films deposited from these baths is extremely sensitive to minute current density variations (see FIG. 5 curve labeled Wolf's bath). These films exhibit a tensile stress, with a nonuniform stress gradient through the thickness of the film (the films curl when removed from the substrate).

Figure 4A:
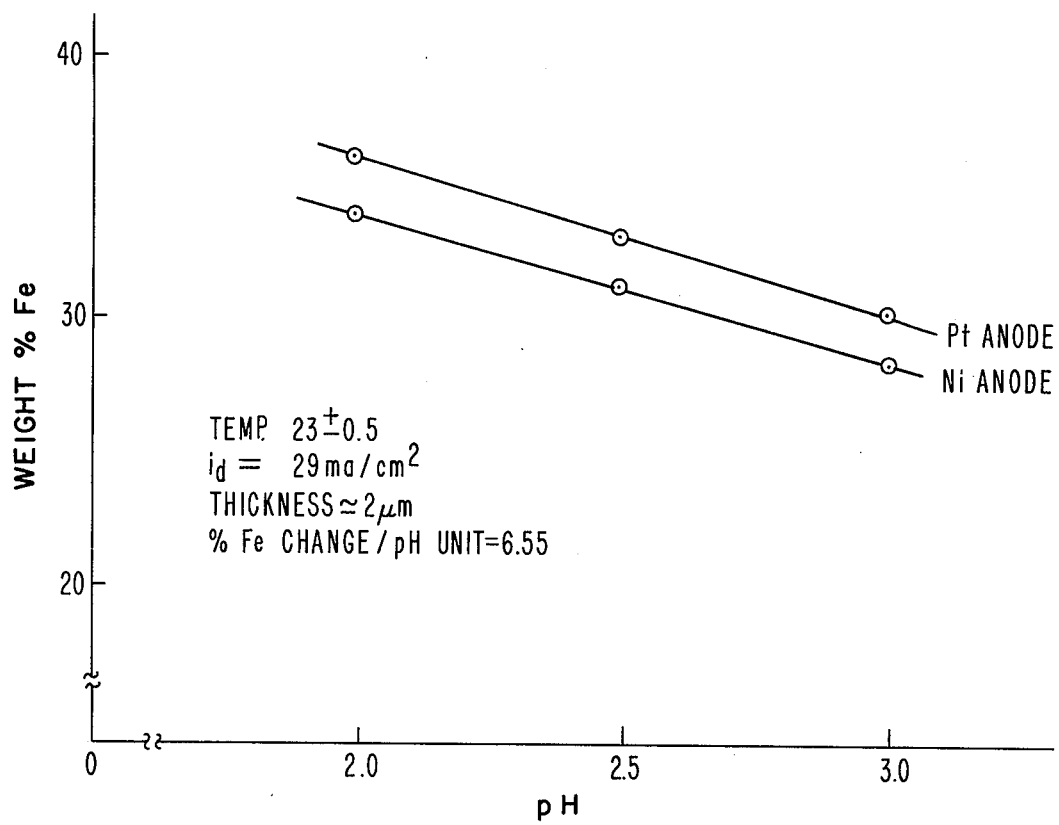
FIG. 4A shows a graph of percentage of iron by wt. vs. pH.
Figure 4B:
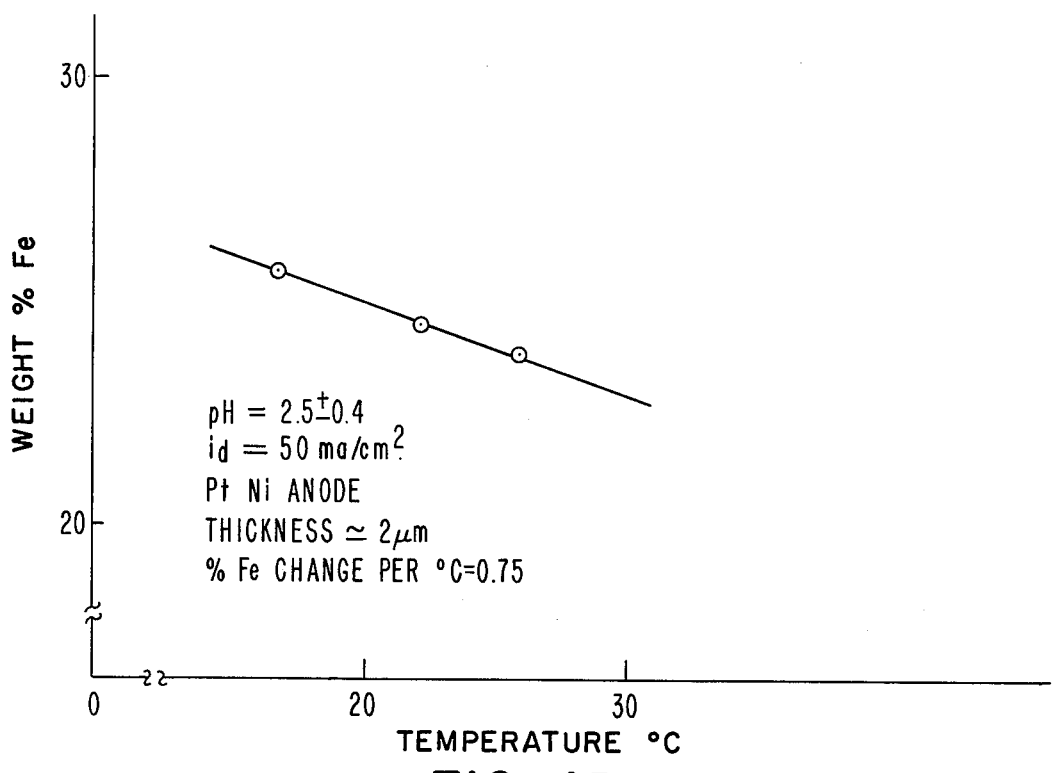
FIG. 4B shows a graph of percentage of iron by wt. vs. temperature.
Figure 5:
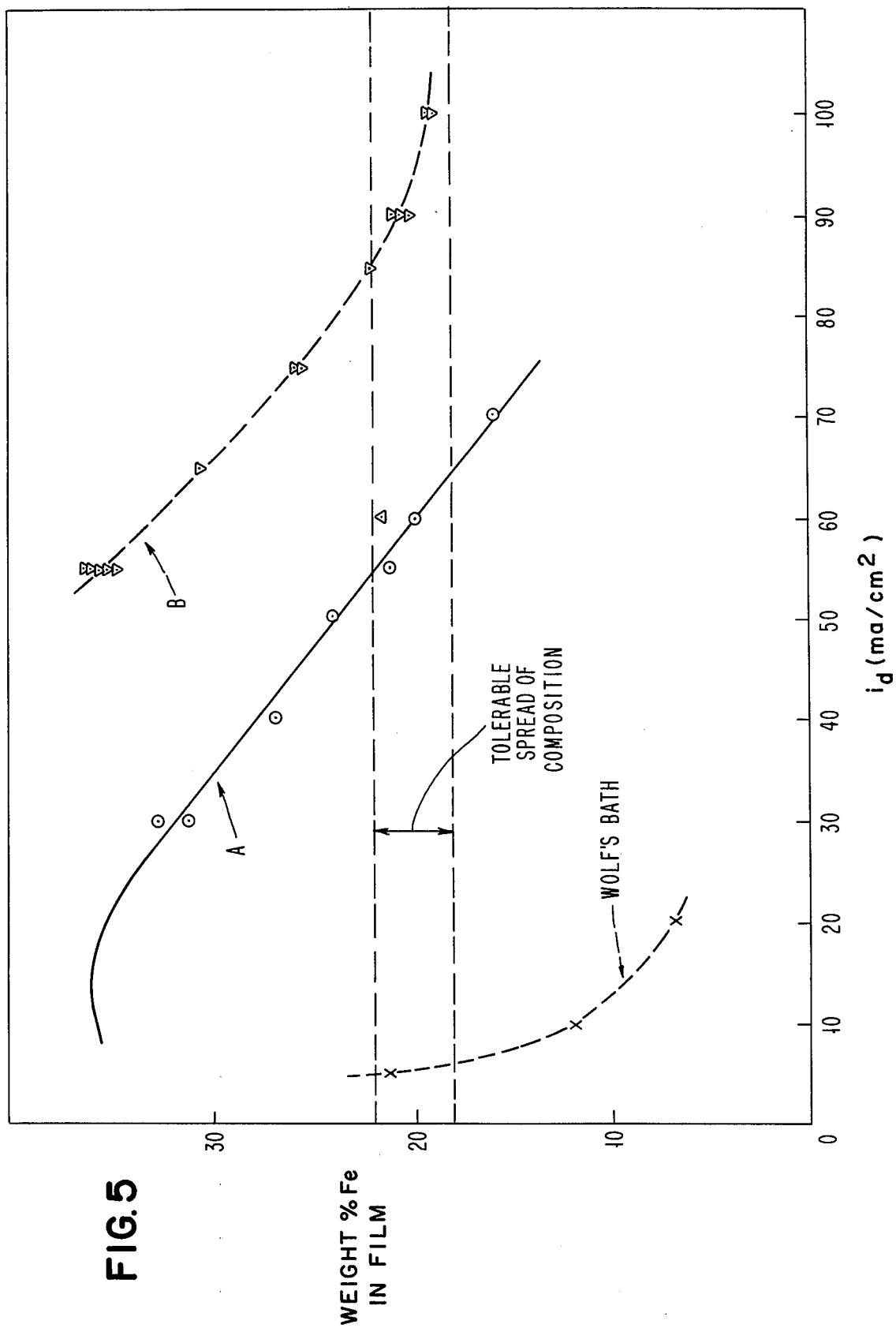
FIG. 5 shows a graph of percentage of Fe in a film by weight vs. plating current per unit area relative to the limits of the tolerance band for producing Permalloy films of 19–21% Fe by weight.

FIGS. 4A, 4B and 5 and Table II summarize the effect of the more important plating parameters on the film composition and on magnetic properties of sheet films. The reader is referred to these FIGS. 4A, 4B, and 5 and in particular to Table II. FIG. 5 gives a comparison of the rate of change of the iron content in the film with current density for the present bath and for a Wolf's type bath.

The well known Wolf's bath gives an iron composition vs. current density curve shown in dotted line form in FIG. 5. This curve shows a very sharp essentially vertical line with the tolerance band lines marking a 19 − 21% Fe tolerable spread of the metal composition required for Permalloy Ni-Fe alloy corresponding to a current range of 7-8 ma/cm², which means that a slight 1 ma/cm² shift in current can throw the bath out of the Permalloy 19 - 21% Fe alloy range. In the case of curve A, the corresponding current range is 55 - 65 ma/cm², which is a far wider range in absolute terms and as a percentage of the current than that for the Wolf's bath. Curve A is based upon $2\mu$ thick films with weak agitation. The pH is allowed to change from 2.5 to 2.9 while plating, and the iron content of about 1.35 g/l is allowed to drop. Curve B shows the result of intense agitation and adjustment of pH at 2.5 and iron at 1.41 g/l. Note that for Curve B, above 80 ma/cm² and for Curve A, between 5 and 20 ma/cm², the result is practically independent of current density. The films plated from the present bath at current densities anywhere between 5 and about 100 ma/cm² show very small internal stress gradient. The stress gradient is uniform throughout the thickness of the film, and when the film is lifted off the substrate, it does not curl.

Films plated at low current densities, i.e., $\simeq 30$ ma/cm² initially, when only $\simeq 0.5$ $\mu$m thick, have an extremely pronounced texture orientation. The 110 plane is in the plane of the film. As the thickness increases, orientation diminishes. The orientation diminishes more rapidly in films plated at higher current densities. Films plated at $\simeq 60$ ma/cm² show very little grain orientation. All films are under a tensile stress. The stress has a uniform gradient through the thickness of the film. Upon heating to 200° C for 2 to 4 hours, the tensile stress increases.

Figure 6:
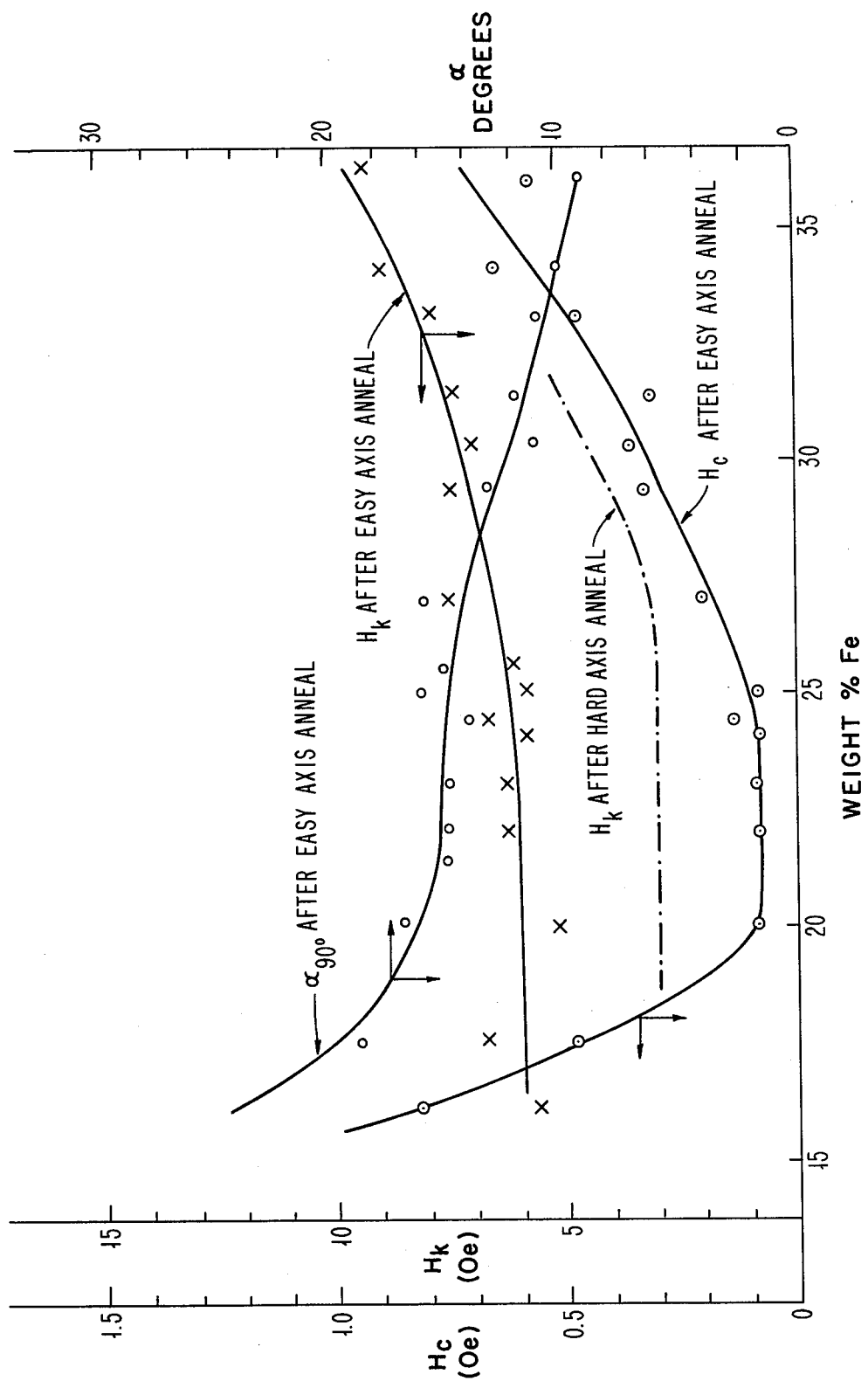
FIG. 6 shows a graph of the coercive force $H_c$, of the anisotropy field $H_k$ and the anisotropy field dispersion $\alpha$ vs. weight percent of Fe.

FIG. 6 is a plot of static magnetic properties $H_c$, $H_k$, and $\alpha + \beta$ for the 2 $\mu$m thick films as a function of the weight % of Fe in the film. All solid lines in FIG. 6 represent films which were annealed in an easy axis field. The dashed curve represents values of $H_k$ for the 2 $\mu$m thick films after they have been annealed in a cross-field. The hard axis (cross-field) annealing results in lowering of the $H_k$ value by about 50% to 80% based on the original $H_k$ value in a plated form. The $H_c$ and $\alpha + \beta$ values are not shown for the films after hard axis annealing because $H_c$ in the 2 $\mu$m thick films changes only very slightly during the hard axis annealing. The $\alpha + \beta$ increased during the hard axis anneal by about 25%.

Figure 7:
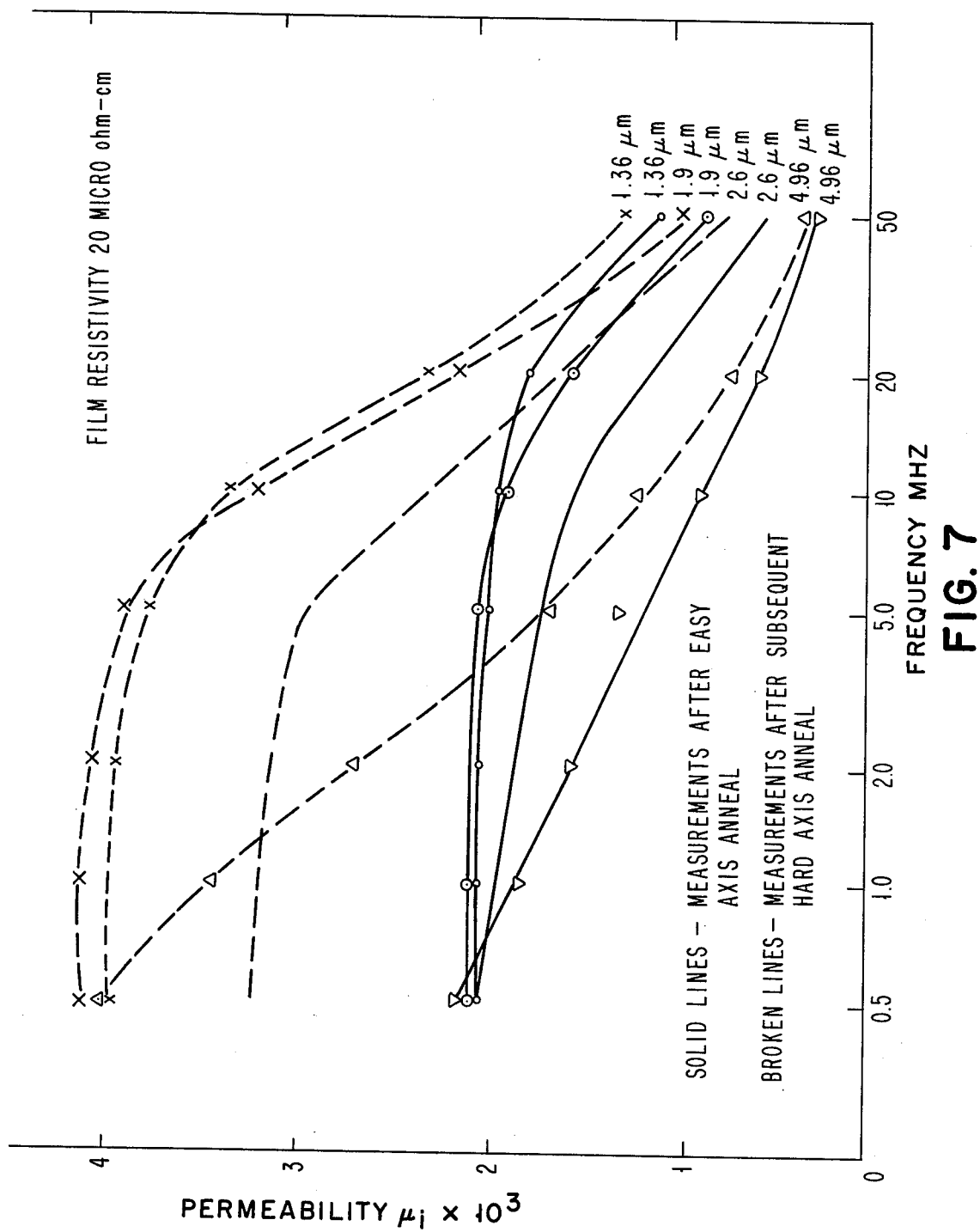
FIG. 7 shows a graph of permeability vs. frequency for the sheet films plated from this bath in two different states of annealing.

FIG. 7 summarizes the results of the measurement of the initial permeability $\mu_i$ as a function of frequency for various thicknesses of films after the easy axis annealing and also for the same films after a subsequent hard axis annealing. The $\mu_i$ value of the easy axis annealed films at low frequencies is about 2,000. This value is in good agreement with the initial permeability reported for Permalloy alloy in bulk form. After hard axis annealing, the initial permeability $\mu_i$ of these films is approximately 4,000. This is again in good agreement with the $\mu_i \propto M_s/H_k$ relation, since the hard axis annealing result is a 50% to 80% decrease of the $H_k$ value.

From the shape of the curves in FIG. 7, it can be concluded that in films thinner than 2 $\mu$m, during switching, eddy current damping does not play a major role. This is as predicted on the basis of 20 micro $\Omega$ — cm resistivity and of the resulting calculated skin depth.

For purpose of fabrication of the high frequency heads for disc file applications, it is desired to maintain the high initial permeability of the films at 2,000 or 4,000 to much higher frequencies than is presently the case. The high initial permeability, at high frequencies, can be maintained by increasing the electrical resistivity of the films. This bath is quite amenable to addition of a third element for deposition of ternary alloys of higher resistivity.

Based on the investigation of the effect of different plating variables on the Permalloy composition reported in FIGS. 4A and 4B and Table II, it is concluded that in order to plate 80/20 nickel-iron films reproducibly on a commercial production basis, it is necessary to control pH within approximately $\pm$ 0.1, temperature within approximately $\pm$ 0.5° C, and iron content of the bath within approximately $\pm$ 5% of the initial value. It is also necessary to control the current density within about $\pm$ 5% and the agitation rate within certain prescribed limits. The last two can be easily controlled by using a well-regulated power supply, a reproducibly fixed distance of the agitation paddle 35 above the cathode, a fixed recirculation rate, and a substantially fixed rate of travel of paddle 35. The first three variables require constant adjustment during each plating run because they tend to change continuously during deposition. Constant recirculation of the solution during plating removes the partially altered solution from the plating tank and continuously introduces from a large reservoir freshly adjusted solution. The filter constantly removes any precipitate or sediment formed during the electrolysis. Thus, recirculation serves a dual function: (a) removal of partially spent solution for its adjustment in the reservoir and removal of the residues, and (b) assistance in obtaining uniform agitation of the plating solution in the tank.

EXAMPLE I

During deposition of 2 $\mu$m of film out of a typical 800 ml bath, the pH of the bath increased by approximately 0.3 to 0.5 pH units (from 2.5 to approximately 2.9), the temperature increased by approximately 0.5° C and the iron content decreased by approximately 2% (while the nickel content remained nearly constant). When an inert, large area Pt screen anode was used, the pH instead of increasing, decreased by approximately 0.2 to 0.4 pH units (from 2.5 to about 2.1).

The reproducibility can be improved and the useful life of the bath can be extended by preparing a large volume of bath and recirculating a portion of it through the plating cell 47, while at the same time constantly monitoring the pH, temperature and intermittently measuring the iron content of the bath in the reservoir and suitably adjusting all three quantities within the limits shown above.

Referring to the arrangement of FIG. 1, the reservoir plating tank and a suitable recirculation system provided excellent results. The pH was controlled only within $\pm$ 0.2 units, the temperature within $\pm$ 0.4° C, and automatic control was provided for the iron content. This resulted in greatly improved reproducibility of the plated films. Later a system was employed which permitted the pH control to within $\pm$ 0.05 pH unit, temperature to within $\pm$ 0.3° C and the iron content of the bath to within approximately 4%.

The high plating rate bath of Table I permits plating of films at a rate as high as 1 $\mu$m/min. and also plating of films at a rate as low as 500 Å/min. The plated film composition is relatively insensitive to small current density variations. Magnetic properties of the plated films are quite acceptable for use in thin film magnetic recording heads.

TABLE I

Preferred Plating Bath Conditions

| | Optimum | Ranges |
|---|---|---|
| $NiCl_2 \cdot 6H_2O$* | 109 g/l | 30 to 150 g/l |
| $FeCl_2 \cdot 4H_2O$* | 5.25 g/l | 4.5 to 5.77 g/l |
| $H_3BO_3$ | 25 g/l | 12.5 to 25 g/l |
| Na Saccharin | 0.8 g/l | 0 to 2 g/l |
| Na Lauryl Sulfate (Maprofix) | 0.2 g/l | Fixed value |
| pH | 2.5 ± 0.1 | 1.5 to 3.6 |
| Current Density | 60 ma/cm² | 10 to 120 ma/cm² |
| Na Citrate, tartrate, oxalate, phosphate** | 10 to 80 g/l | 10 to 80 g/l |

*In addition to chloride salts, sulfate and fluoride salts may be used. The chloride ion can be completely or partially substituted by a sulfate ion. Alternatively, ammonium sulfate salt can be added to the bath in amounts of 50 to 150 g/l.
**Addition of complexing agents is optional

| | |
|---|---|
| Plating rate | About 10,000 A/min (2μ per 2 min) at 60 ma/cm² |
| Agitation | Continuous laminar flow Rate of travel of the paddle about 8"/sec in a reciprocating fashion at about 1/32" spacing above the cathode with a range of spacing of 0 - 1/4" |
| Anode | Pt sheet wrapped with Ni wire mesh |
| Temperature | 25 ± 0.5° C 20 to 35° C |
| Cathode Current Efficiency | About 80% - 90% |

In table I the ratios of Ni:Fe are as follows:

| Low | | | | Conversion Factor |
|---|---|---|---|---|
| $NiCl_2 \cdot 6H_2O$ | 30 g/l | ×.247 | $Ni^{++}$ | 7.4 g/l |
| $FeCl_2 \cdot 4H_2O$ | 4.5 g/l | ×.2815 | $Fe^{++}$ | 1.27 g/l |
| Ni:Fe ion weight ratio | | | | 5.8:1 |
| Optimum | | | | |
| $NiCl_2 6H_2O$ | 109 g/l | ×.247 | $Ni^{++}$ | 26.92 g/l |
| $FeCl_2 \cdot 4H_2O$ | 5.25 g/l | ×.2815 | $Fe^{++}$ | 1.48 g/l |
| Ni:Fe ion weight ratio | | | | 18.2:1 |
| High | | | | |
| $NiCl_2 \cdot 6H_2O$ | 150 g/l | ×.247 | $Ni^{++}$ | 37.05 g/l |
| $FeCl_2 \cdot 4H_2O$ | 5.72 g/l | ×.2815 | $Fe^{++}$ | 1.61 g/l |
| Ni:Fe ion weight ratio | | | | 23.0:1 |

TABLE II

Summary of the Effect of Various Plating Parameters on the Film Composition and on the Magnetic Properties

| | |
|---|---|
| Current Density $i_d$ | As current density increases, the iron content decreases. (FIG. 5) The rate of change is 0.4% Fe/ma/cm² for most of Curve A and part of Curve B in FIG. 5. |
| pH | As pH increases in the 1.5 to 3.5 pH range, the iron content decreases. (FIGS. 4A, 4B and 5) The rate of change is 5.55% Fe/pH unit. |
| Temperature | As temperature increases in the 20 to 35° C range, iron content in the film decreases. (FIGS. 3A, 3B and 4) The rate of change is 0.75% Fe/° C. |
| Agitation | As the mixer distance increases from near contact with the cathode to about 1/4" above the cathode at a fixed $i_d$ of about 60 ma/cm², the iron content increases. The deposit acquires a "burned" appearance, eventually passivates completely when the limiting current is reached at which metal ions cannot be supplied any faster. |
| Change of Iron Content | A 10% change in iron content in the bath results in about 3 to 4% change in iron content in the film. |
| Rate of Depletion of Iron | When using 800 ml of solution in connection with the Pt inert electrode, approximately 1.85% of iron and 0.45% of nickel are used per 1 μm of deposited film. When using a soluble nickel electrode or a mixed Pt-Ni electrode, nickel in the bath remains unchanged. After plating 5 μm of film out of an 800 ml bath, about 9.3% of the original iron in the bath is depleted. |
| Type of Anode | (1) When using an inert Pt anode, pH of the 800 ml bath decreases from 2.5 to about 2.1 during the course of deposition of a 2 μm film. (2) When using a soluble nickel anode, the pH increases rapidly. When using a mixed Pt-Ni anode, the pH of the 800 ml bath increases from 2.5 to about 2.9 much more slowly. |
| Substitution of $Cl^-$ by $SO_4^=$ and by $F^-$ | When $Cl^-$ is substituted by $So_4^=$, slightly lower $H_c$, $\alpha + \beta$ and $H_k$ are obtained. When $Cl^-$ is substituted by $F^-$, there are no major changes in film composition or magnetic properties. |
| Change in Na Saccharin | When Na Saccharin is completely absent, films are highly stressed and lift off the substrate after about 1 to 1.5 μm of film is deposited. At about 0.4 g/l of Na Saccharin, the internal stress is sufficiently reduced at 5 to 8 μ thick films can be readily plated. Beyond 0.4 g/l and up to 2 g/l of Na Saccharin, only very slight changes in magnetic properties are observed. |
| Addition of Cobalt Sulfate | In amounts up to 2.3 g/l, $H_c$ decreases, $\alpha + \beta$ decreases, however, $H_k$ nearly doubles. The film contains about 10% Co. |

TABLE III

Iron and Hydrogen Ion Make-up Solution for Burette 65

| | |
|---|---|
| $FeCl_2 \cdot 4H_2O$ | 20 g/l or equivalent amount of $FeSO_4$ |
| HCl | Enough to produce pH 0.5 solution |

In cases in which a Permalloy film is plated over a cathode which has recesses and raised areas or when it is necessary to plate a Permalloy film through a resist mask (both of which situations occur in fabricating magnetic thin film heads and bubble memory overlays), the strong composition dependence upon small current density variation is extremely undesirable and, indeed, makes it impossible to electroplate usable films. In connection with wire memory fabrication, other baths were developed which permit electroplating Permalloy films at very high rates. (T. R. Long, J. Appl. Physics, 31, Suppl. (5) 1960; E. Toledo, R. Mo, Plating, 57, p. 43, 1970.)

The present bath, plating technique and apparatus for electrodeposition of Permalloy films permit reproducible deposition of 80/20 films from low nickel:iron ratio baths at rates which are both practical and easy to control when plating films anywhere from 1,000 Å to 5 microns thick. This bath has an excellent throwing power. At low, moderately high, and high current densities and in presence of strong agitation, it gives deposits whose composition is nearly independent of the current density (see FIG. 5 curves A and B, FIG. 9 curves AA and BB and FIG. 8, curves A, B, C, D, and E). These features make the bath unique and particularly useful for plating various magnetic devices in which it is necessary to deposit the film through a resist mask.

Below are given the key features of the bath, plating apparatus and technique and properties of the resulting films:

1. The film composition is either only slightly dependent current density of 20 to 85 ma/cm² or is even completely independent of the current density variation over a wide range of currents below 20 ma/cm² and above 80 ma/cm². (At high agitation rates and moderately high current densities, the composition is substantially independent of the current density.)

2. The films are relatively stress free even when plated up to 25 μ thick. The films do not curl when lifted off the substrate, which indicates that the stress gradient through the thickness of the film is linear. The features described in (1) and (2) permit electroplating very narrow (down to 2.5μ) lines and patterns through a mask without lifting or peeling of the pattern.

3. The films deposited from this bath possess a high initial permeability. The permeability of these films can be increased further by hard axis annealing. The high initial permeability, substantially closed hard axis loops, and easy magnetic switching, without hard axis locking and/or without excessive remanance, make the films particularly useful for fabricating magnetic thin film recording devices.

4. The films plated from this bath, when using the disclosed pH, temperature control, and iron addition and control, are uniform with respect to composition throughout their thickness except for the first 100 to 300Å in which there is a composition gradient.

5. The film deposition rate, while it can be relatively high (up to about 1μm/min), is slow enough to allow accurate thickness control in films which are only 500 Å thick.

6. The bath is relatively insensitive to variations in temperature.

7. The plating apparatus is designed so as to permit controlling pH at 2.5 ± 0.05, temperature at 25° ± 0.5° C, and iron in the bath at 1.41 ± 0.02 g/l. The pH is controlled using a pH stat composed of meter 61 and comparator 76 coupled with solenoid valve 63 and the burette 65 containing HCl solution and $Fe^{++}$ ions described above in Table III.

8. Since the rate of loss of iron is directly proportional to the rate of change of the pH, iron is added simultaneously from burette 65 while adjusting the pH. The rate of Fe consumption can be observed during plotting without any adjustment to produce a calibration curve. It has been found that the rate of $[Fe^{++}]$ consumption is proportional to the change of the pH. Based on the calibration curve, a suitable make up solution is prepared, as will be obvious to those skilled in the art. Up to 100 μm of Permalloy is plated onto a 4.5 inches × 4.5 inches substrate with iron $[Fe^{++}]$ ions in the bath being maintained at 1.41 g/l and pH at 2.5 ± 0.05. The bath composition is shown in Table I. Composition of the HCl-Iron make-up solution is shown in Table III.

9. The bath is normally operated under conditions (pH and total iron in the bath) under which ferric ion in excess of about 0.01 g/l precipitates out and is filtered out prior to entering the plating cell.

10. The ferric ion formation can be further reduced by addition of complexing ions such as citrate, tartrate, oxalate, phosphate, isoascorbic acid, and the like. All of the above, when added in small quantities, do not substantially alter the plating conditions under which an 80/20 composition is obtained. In addition, the ferrous to ferric ion oxidation can also be diminished by preparing the iron make-up solution using $FeSO_4 \cdot 4H_2O$-HCl solution (rather than $FeCl_2 \cdot 4H_2O$) and by adding ammonium sulfate salt to the bath.

TABLE IV

| Bath Plating Conditions for Plating Through Masks | | |
|---|---|---|
| | Optimum | Ranges |
| $NiCl_2 \cdot 6H_2O$ | 109 g/l | 70 – 180 g/l |
| $FeCl_2 \cdot 4H_2O$ | 1.5 g/l | 1.1 to 3.8 g/l |
| $H_3BO_3$ | 25 g/l | 12.5 to 25 g/l |
| Na Saccharin | 0.8 g/l | 0.4 to 0.8 g/l |
| Na Lauryl Sulfate | 0.2 g/l | 0.2 g/l to 0.4 g/l |
| $H_2O$ | make up to 1 liter | make up to 1 liter |
| $i_d$ | ≃ 5 ma/cm² | 5 to 40 ma/cm² |
| Plating rate | 500Å/min | 500 – 30,000Å/min |
| pH | 2.5 | 1.5 to 3.6 |
| Na Citrate, tartrate oxalate, phosphate** | 10 to 30 g/l | 10 to 30 g/l |
| $[Ni^{++}]$ | 26.9 g/l | 17 to 44 g/l |
| $[Fe^{++}]$ | .42 g/l | .31 to 1.07 g/l |
| Ni:Fe ratio in g/l | 64:1 | 86:1 to 25.1:1 g/l |

**Addition of complexing agents is optional.

One of the unique features of this bath, when used in connection with the plating apparatus discussed, is the extremely broad range of current densities under which it can be used to plate sound, usable NiFe deposits in sheet film form.

Even more unique is the capability of the same bath with only minor adjustment of the $[Fe^{++}]$ concentration to be used for plating discrete patterns through masks with excellent thickness and compositional uniformity.

Figure 9:
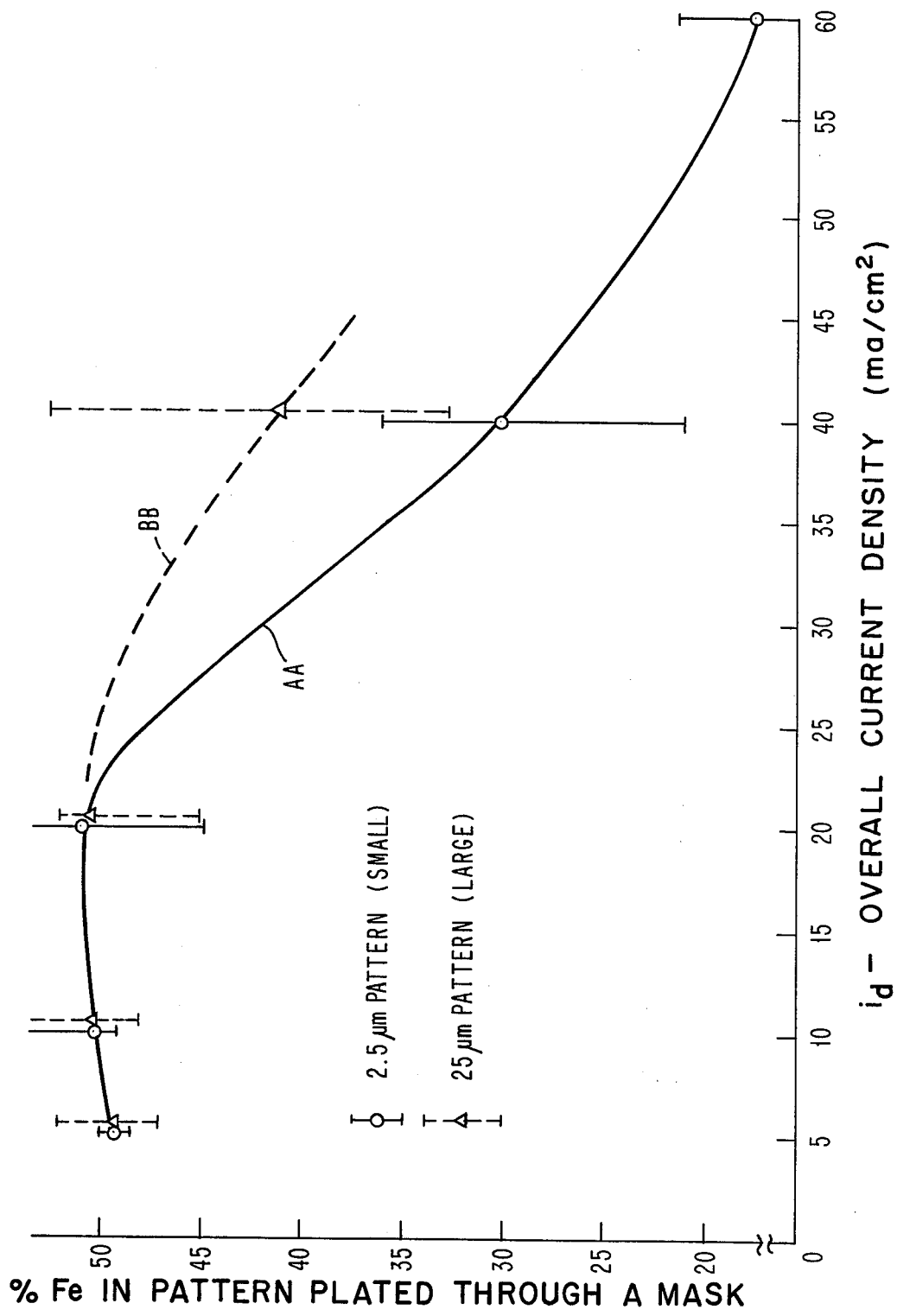
FIG. 9 is a graph of percentage of iron in the film vs. overall current when plating T and I bar patterns through a mask.

In particular, films were plated in 2.5μm and 25μm wide lines [slots] in resist with varying spaces and into 2.5μm T and I bar patterns. FIG. 9 shows the relationship between the percentage of Fe in the film and the current density for both the 2.5μm pattern on varying spaces from 0.25μm through 500μm. While in this case no attempt was made to obtain a 20/80:Fe/Ni composition from FIG. 9, it is obvious that excellent compositional uniformity was obtained when overall current density of 5 ma/cm² through 25 ma/cm² was used. From curve AA and the bars around each point showing the spread of data in the 50 points examined, it is clear that smallest deviation from the mean takes place at an overall current density of 5 ma/cm² (equivalent to a 1545Å/min plating rate Table V). As the current density is increased to an overall value of 10 ma/cm² (5,000Å/min plating rate Table V) to 20 ma/cm² (9,000Å/min plating rate), the deviation from the mean increases (long vertical bars in FIG. 9). At an overall current density of 40 ma/cm² equivalent to a plating rate of 30,000Å/min, the mean value is shifted considerably downward to a lower %Fe and the spread of %Fe over isolated 2.5μm patterns is very large. The deviation of the film thickness is very large compared to the deviation for 5 and 10 ma/cm² average current densities. Table V shows examples of mean thickness and thickness spread for the 5, 10, 20, 40 and 60 ma/cm² overall current density. A similar situation exists in the case of plating of 25μm bars at varying spaces on curve B—B, except the absolute value of the mean %Fe is slightly lower at 5 ma/cm², 10 ma/cm² and 25 ma/cm².

Figure 8:
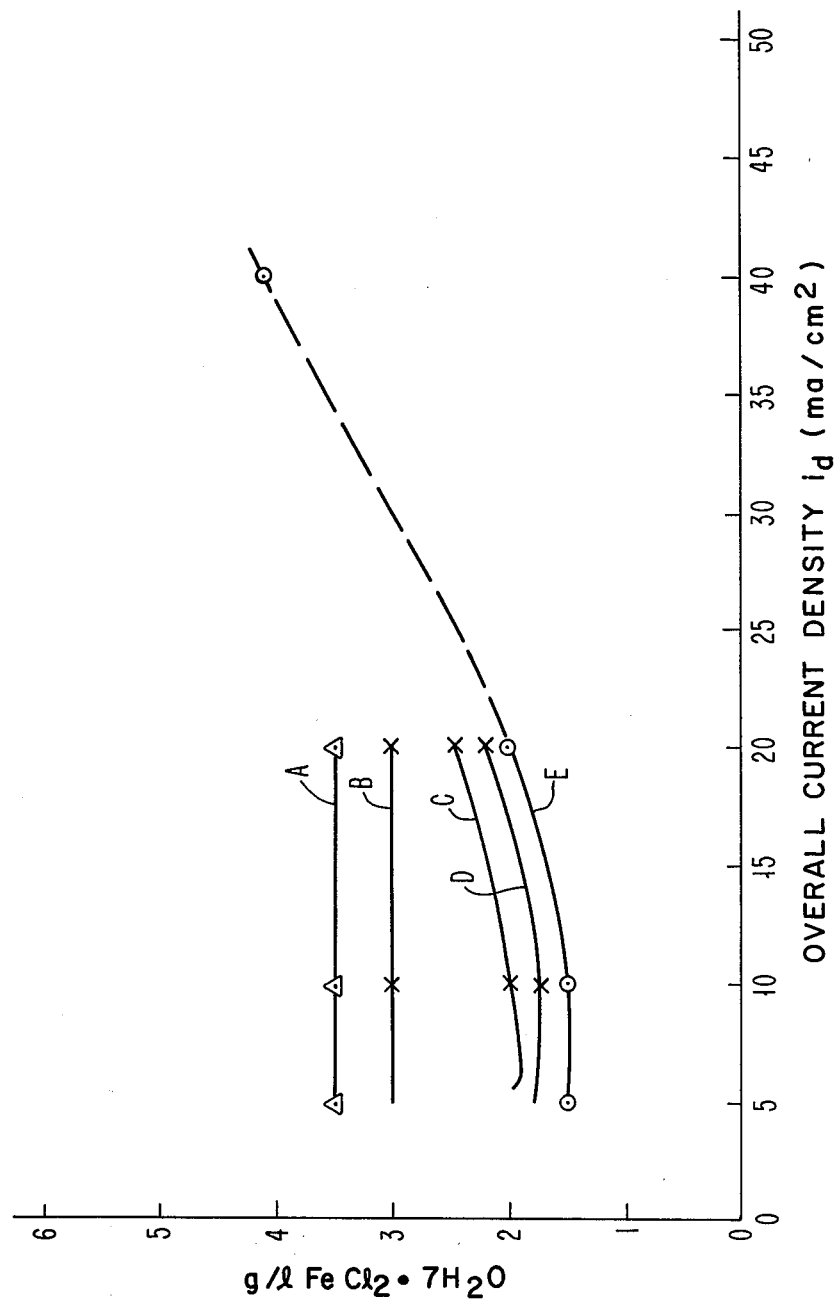
FIG. 8 is a graph of isocomposition lines of $FeCl_2\cdot 7H_2O$ in grams per liter vs. the overall current density in ma/cm$^2$ for plating through a mask.

FIG. 8 represents the relationship between the iron $[Fe^{++}]$ ion content of the bath and the overall current density for the plating of 2.5μm lines and T and I bar patterns for bubble memory devices through masks. The curves marked A through E are isocomposition lines, with curve E representing 20% Fe, D about 22% Fe, C about 25% Fe, B about 40% Fe, and A about 50% Fe in the film. This figure points to the key part of the invention showing the fact that while plating through masks, the film composition does not vary over a relatively broad range of current densities (namely, 5 ma/cm$^2$ through almost 20 ma/cm$^2$ of the overall current density). Such behavior is most unique and unexpected in electroplating baths which are known to have anomalous codeposition of Fe with the host metal. It permits the dimensions of the patterns and the spacing of the patterns to vary over a rather large range without adversely affecting the film composition or thickness from a spot to spot on the cathode plated through a mask.

PLATING THROUGH A MASK

In plating from the bath of this invention onto a metallic film coated with a mask of a photoresist or the like, results have been obtained using the bath compositions outlined below in Examples II – V for providing 80/20 compositions of nickel and iron.

EXAMPLE II

The bath included the constituents as follows:

| | | |
|---|---|---|
| NiCl$_2$. 6H$_2$O | 109 g/l | 26.9 g/l [Ni$^{++}$] |
| FeCl$_2$. 4H$_2$O | 1.85 g/l | .521 g/l [Fe$^{++}$] |
| H$_3$BO$_3$ | 12.5 g/l | |
| Na Saccharin | 0.4 g/l | |
| Na Lauryl Sulfate | 0.4 g/l | |
| H$_2$O | make up to 1 liter | |

The overall plating current density was 20 ma/cm$^2$, and a pH level of 2.5 was maintained. An excellent film was produced. The Ni:Fe ratio in the bath was 51.6:1 in g/l.

EXAMPLE III

The same bath as in Example II was used with the only exceptions as follows:

| | | |
|---|---|---|
| FeCl$_2$. 4H$_2$O | 1.1 g/l | .31 g/l [Fe$^{++}$] |
| Na Lauryl Sulfate | 0.2 g/l | |

The overall plating current density was 10 ma/cm$^2$ with a pH of 2.5. Similar results were achieved.

In this case, the nickel-iron ion g/l ratio in the bath was 84.3:1

EXAMPLE IV

The same bath as in Example III was used with the only exceptions as follows:

| | | |
|---|---|---|
| FeCl$_2$ | 3.8 g/l | 1.07 g/l [Fe$^{++}$] |
| H$_3$BO$_3$ | 25 g/l | |
| Na Saccharin | 0.8 g/l | |
| Na Lauryl Sulfate | 0.4 g/l | |

The overall plating current density was 40 ma/cm$^2$ and pH was held at 2.5. The nickel-iron g/l ratio in the bath was 25:1. No recirculation was used other than paddle agitation and bath volume was 200cc. This bath was used for plating a single 2$\mu$m film.

EXAMPLE V

The same bath as in Example IV was used with the only exception as follows:

| | | |
|---|---|---|
| FeCl$_2$ | 1.5 g/l | 0.472 g/l [Fe$^{++}$] |

The overall plating current density was 5 ma/cm$^2$ for a plating rate of 1545Å/min and 10 ma/cm$^2$ for a plating rate of 5000Å/min (Table V). The pH was held at 2.5. The nickel-iron g/l ratio in the bath was 63.74:1.

Plating Non 80/20 Range Ni/Fe Composition: Sheet Form

In plating from the bath of this invention of a metallic film in sheet form, favorable results have been obtained using the bath compositions outlined below in Examples VI to X for providing nickel-iron films.

EXAMPLE VI

The bath included the constituents as follows:

| | | |
|---|---|---|
| NiCl$_2$. 6H$_2$O | 109 g/l | 26.9 g/l [Ni$^{++}$] |
| FeCl$_2$. 4H$_2$O | 5.0 g/l | 1.4 g/l [Fe$^{++}$] |
| H$_3$BO$_3$ | 25 g/l | |
| Na Saccharin | 0.8 g/l | |
| Na Lauryl Sulfate | 0.5 g/l | |
| pH | 2.5 | |

The plating current density was 5 ma/cm$^2$ at a plating rate of 1545Å/min. The film produced was 50% Fe. The Ni:Fe ratio in the bath was 19.2:1 in g/l.

EXAMPLE VII

The same bath as in Example VI was used with the only differences as follows:

The plating current density was 10 ma/cm$^2$, the plating rate was about 5000Å/min, and the percentage of Fe was about 52.

EXAMPLE VIII

The same bath as in Example VI was used with the only differences as follows:

The plating current density was 20 ma/cm$^2$, the plating rate was 10,000Å/min and the percentage of Fe was about 50.

EXAMPLE IX

The same bath as in Example VI was used with the only differences as follows:

The plating current density was 40 ma/cm$^2$, the plating rate was 30,000Å/min, and the percentage of Fe was about 30.

EXAMPLE X

The same bath as in Example VI was used with the only differences as follows:

The plating current density was 60 ma/cm$^2$, the plating rate was 55,000Å/min, and the percentage of Fe was about 20.

Plating 80/20 Ni/Fe Composition — Sheet Form

In plating from the bath of this invention to form a metallic film in sheet form, favorable results have been obtained using the bath compositions outlined below in the Examples XI and XII for providing 80/20 Ni/Fe films.

EXAMPLE XI

| | | |
|---|---|---|
| NiCl$_2$. 6H$_2$O | 109 g/l | 26.9 g/l [Ni$^{++}$] |
| FeCl$_2$. 4H$_2$O | 5.25 g/l | 1.45 g/l [Fe$^{++}$] |
| H$_3$BO$_3$ | 25 g/l | |
| Na Saccharin | 0.8 g/l | |
| Na Lauryl Sulfate | 0.2 g/l | |
| pH | 2.5 + 0.1 | |

The plating current density was 60 ma/cm$^2$, Na citrate, tartrate, oxalate, or phosphate was included to 10 to 30 g/l. The percentage of iron in the films produced was 20 ± 2. The plating rate was about 10,000Å/min. The Ni:Fe ratio was 18.55:1 in the bath in g/l.

EXAMPLE XII

| | | |
|---|---|---|
| NiCl$_2$ . 6H$_2$O | 40 g/l | 10 g/l [Ni$^{++}$] |
| NiSO$_4$ . 6H$_2$O | 20 g/l | 4.5 g/l [Ni$^{++}$] |
| FeCl$_2$ . 4H$_2$O | 4.5 g/l | 1.25 g/l [Fe$^{++}$] |
| Na Saccharin | 0.8 g/l | |
| Na Lauryl Sulfate | 0.2 g/l | |
| pH | 2.5 ± 0.1 | |
| Temperature | 25° C ± 0.5° C | |

The current density was 30 ma/cm$^2$, and the plating rate was about 5,000Å/min. The percentage of Fe in the films produced was 20 ± 2. There were 14.5 g/l of [Ni$^{++}$] and 1.25 g/l of [Fe$^{++}$] for an Ni:Fe ratio of 11.6:1 in the bath in g/l.

Plating With Prior Art Bath

EXAMPLE XIII

A plating bath of the composition shown in U.S. Pat. No. 3,652,442 was prepared to consist of:

| | | |
|---|---|---|
| NiCl$_2$ . 6H$_2$O | 109 g/l | 26.9 g/l Ni |
| FeCl$_2$ . 4H$_2$O | 3.9 g/l | 1.10 g/l Fe |
| H$_3$BO$_3$ | 12.5 g/l | |
| Na Lauryl Sulfate | 0.2 g/l | |
| Na Saccharin | 0.4 g/l | |
| Temperature | 25° C | |
| Current density | 20 ma/cm$^2$ | |

Films were plated from this bath as prepared without adjusting the pH to 2.5 through a 2.5 μm aperture mask.

The films had very highly modular surfaces with some "burning" around the edges and showed very large thickness variations over the surfaces of the wafers, and showed signs of severe internal stresses and flaking. The nickel:iron ratio in the bath was 24.4:1.

Even though the bath shown above is similar to the bath in Example IV, it gives "burned" (black: rough and oxidized which are also too high in iron) deposits which also are too high in iron content to be useful in magnetic bubble memory devices.

EXAMPLE XIV

When plating bath #3 from U.S. Pat. No. 3,652,442 was used without adjustment of pH in connection with the present apparatus and plated at 25° C with agitation as described in Table 1 and at the preferred current density of 60 ma/cm$^2$, the films had high H$_c$ values, partially open B-H loops, and showed distinctly less that 15% Fe. This range thus shows itself to be too low to produce 80:20 magnetic films.

We have found that automatic and continuous measurement with automatic adjustment avoids long response times and large fluctuations in solution temperature, pH, and specific gravity. The large storage reservoir tank permits holding fluctuations low, and provides automatic quick response to any changes. It has been found also that specific gravity is not a satisfactory measure of the rate of consumption of reagents, particularly [Fe$^{++}$] which is the most sensitive quantity (reagent). The change of [Fe$^{++}$] is proportional to pH as taught herein, and hence it is necessary to measure pH only on a continuous basis and to predetermine the [Fe$^{++}$] ion consumption in order to make an appropriate adjustment in the [Fe$^{++}$] content of the bath along with adding acid. [Fe$^{++}$] is lost through plating out and through oxidation to [Fe$^{+++}$]. At a pH above 3.5, [Fe$^{++}$] will tend to precipitate to a small degree, which is then taken out by the filter in the line. Measurements have yielded a calibration curve not included herein which shows the close relationship of the change of pH to Fe$^{++}$ consumption. This data has been used to precalculate the ratio of H$_c$ to [Fe$^{++}$] added while adjusting pH as shown in Table III above.

TABLE V

Plating Through the Mask with Long Line Openings Varying from 2.5 μm to 25 μm with Varying Spaces

| | Plating Rate Average Spread of Data for a Wafer | | |
|---|---|---|---|
| 5 ma/cm$^2$ | 1545Å/min | 1540 | 1550 |
| | spread of composition 47 to 52% Fe (FIG. 9) | | |
| 10 ma/cm$^2$ | 5000Å/min | 4375 | 5333 |
| | spread of composition 48 to 53% Fe | | |
| 20 ma/cm$^2$ | 9000Å/min | 8700 | 12,167 |
| | spread of composition 45 to 54% Fe | | |
| 40 ma/cm$^2$ | 25,000Å/min | 18,000 | 30,000 |
| | deposits very nodular and "burned" | | |
| | spread of composition 22 to 52% Fe | | |
| 60 ma/cm$^2$ | 50,000Å/min | 35,000 | 57,000 |
| | deposits very nodular and "burned" | | |
| | spread of composition 11 to 23% Fe | | |

TABLE VI

Process Limits for Ni-Fe Plating Without "Burning", with Sound, Bright Deposits and Good Adhesion

| | Sheet Form | Through a Mask |
|---|---|---|
| Plating Current Density | 10–200 ma/cm$^2$ | 2–60 ma/cm$^2$ |
| [Fe$^{++}$] | 1 – 14 g/l | 0.3 – 1.0 g/l |
| [Ni$^{++}$] | 7 – 37 g/l | 17 – 44 g/l |
| Agitation | none to ultrasonic | mechanical agitation |
| pH | 1 – 3.6 | 1 – 3.6 |
| Temperature | 20 – 35° C | 20 – 35° C |

TABLE VII

Limits for Plating Ni-Fe, 20% Fe ± 1%

| | Sheet Form | Through a Mask |
|---|---|---|
| Plating Current Density | 10–200 ma/cm$^2$ | 2–60 ma/cm$^2$ |
| [Fe$^{++}$] | 1.1 – 1.7 g/l | 0.3 – 0.7 g/l |
| [Ni$^{++}$] | 7 – 37 g/l | 17 – 44 g/l |

Agitation, pH and temperature ranges were the same as in TABLE VI.

What is claimed is:

1. A nickel-iron electroplating method for coating a substrate having a mask deposited thereon including means for electroplating a nickel-iron film onto a sheet substrate of a metallic material,
    said method including employing a plating current density of about 2 – 60 ma/cm$^2$,
    a plating bath fluid having an Fe$^{++}$ ion concentration of about 0.3 g/l to about 1.0 g/l,
    an Ni$^{++}$ ion concentration of about 17–44 g/l, a pH of about 1 – 3.6, and maintaining said fluid at a temperature of about 20° – 35° C,
    wherein Fe$^{++}$ ion concentration required for plating is inverse to circulation of said plating bath fluid across said substrate.

2. An electroplating method in accordance with claim 1 including
    cell means for containing said plating bath fluid, an anode, a cathode including said substrate to be plated with said nickel-iron film, said cell including means for holding said cathode with the surface to be plated facing the anode of said cell, an inlet to said cell aligned with the surface of said cathode whereby said inlet is adapted to pass plating bath fluid directly onto the surface of said cathode, a reservoir for said plating bath fluid having an outlet connected by conduit means to said inlet, means for pumping said fluid up from said reservoir into said inlet via said conduit means, an outlet from said cell for carrying said plating bath fluid into said reservoir, a chemical sensor for producing an electrical signal as a function of a chemical concentration present in said system, and a reagent dispenser for automatically dispensing at least one reagent including $Fe^{++}$ ions through a valve into said reservoir in response to said signal from said sensor.

3. A method in accordance with claim 1 wherein said bath fluid has a nickel-iron ion ratio of about 25:1 to about 86:1.

4. An electroplating method in accordance with claim 2 wherein said cell includes a mixer for providing agitation without substantial turbulence.

5. An electroplating method in accordance with claim 2 wherein said chemical sensor comprises a pH sensor, and said reagent dispenser dispenses acid and $Fe^{++}$ ions.

6. A method in accordance with claim 2 wherein said reservoir includes a temperature sensor, a thermostatic control, and heating means for automatically maintaining the temperature of said plating bath.

7. A nickel-iron electroplating method for coating a substrate having a mask deposited thereon including means for electroplating nickel-iron alloy films containing about 20% iron onto a sheet substrate of a metallic material having said mask thereon, said method including employing a plating current density of about 2 – 60 ma/cm$^2$, a plating bath fluid having an $Fe^{++}$ ion concentration of about 0.3 g/l to about 0.7 g/l, an $Ni^{++}$ ion concentration of about 17 – 44 g/l, a pH of about 1 – 3.6, and maintaining said bath at a temperature of about 20° – 35° C, wherein $Fe^{++}$ ion concentration required for plating 20% iron is inverse to circulation of said plating bath fluid across said substrate.

8. An electroplating method in accordance with claim 7 including cell means for containing said plating bath, an anode, a cathode including said substrate to be plated with an NiFe metallic film, said cell including means for holding said cathode with the surface to be plated facing the anode of said cell, an inlet to said cell aligned with the surface of said cathode whereby said inlet is adapted to pass plating bath fluid directly onto the surface of said cathode, a reservoir for said plating bath fluid having an outlet connected by conduit means to said inlet, means for pumping said plating bath fluid up from said reservoir into said inlet via said conduit means, an outlet from said cell for carrying said plating bath fluid into said reservoir, a chemical sensor for producing an electrical signal as a function of a chemical concentration present in said system, and a reagent dispenser for automatically dispensing at least including $Fe^{++}$ ions one reagent through a valve into said reservoir in response to said signal from said sensor.

9. A method in accordance with claim 7 wherein said bath fluid has a nickel-iron ratio of from about 25:1 to about 85:1.

10. A method in accordance with claim 8 wherein said cell includes a mixer for providing agitation without substantial turbulence.

11. A method in accordance with claim 8 wherein said chemical sensor comprises a pH sensor, and said reagent dispenser dispenses acid and $Fe^{++}$ ions.

12. A method in accordance with claim 8 wherein said reservoir includes a temperature sensor, a thermostatic control, and heating means for automatically maintaining the temperature of said plating bath.

13. A nickel-iron electroplating method including means for electroplating a nickel-iron film onto a sheet substrate of a metallic material, said method including employing a plating current density of about 10 – 200 ma/cm$^2$, a plating bath fluid with an $Fe^{++}$ ion concentration of about 1 – 14 g/l an $Ni^{++}$ ion concentration of about 7 – 37 g/l, and a pH of about 1 – 3.6 maintaining said bath at a temperature of 20° – 35° C, wherein $Fe^{++}$ ion concentration required in the bath for a predetermined Ni percentage in the nickel-iron film is an inverse function of circulation of bath fluid across said substrate.

14. An electroplating method in accordance with claim 13 including cell means for containing said plating bath fluid, an anode, and a cathode including said substrate to be plated with said nickel-iron film, said cell including means for holding said cathode with the surface to be plated facing the anode of said cell, an inlet to said cell aligned with the surface of said cathode whereby said inlet is adapted to pass said plating bath fluid directly onto the surface of said cathode, a reservoir for said plating bath fluid having an outlet connected by conduit means to said inlet, means for pumping fluid up from said reservoir into said inlet via said conduit means, an outlet from said cell for carrying said plating bath fluid into said reservoir, a chemical sensor for producing an electrical signal as a function of a chemical concentration present in said system, and a reagent dispenser for automatically dispensing at least one reagent including $Fe^{++}$ ions through a valve into said reservoir in response to said signal from said sensor.

15. A method in accordance with claim 13 wherein said bath fluid has a nickel-iron ratio of about 5.8:1 to about 23:1.

16. A method in accordance with claim 14 wherein said cell includes a mixer for providing agitation without substantial turbulence.

17. A method in accordance with claim 14 wherein said chemical sensor comprises a pH sensor, and said reagent dispenser dispenses acid and $Fe^{++}$ ions.

18. A method in accordance with claim 14 wherein said reservoir includes a temperature sensor, a thermostatic control, and heating means for automatically maintaining the temperature of said plating bath.

19. A nickel-iron electroplating method including the process of electroplating nickel-iron films containing about 20% iron ± 1% onto a sheet substrate of a metallic material,
said method including employing a plating current density of about 10 – 200 ma/cm$^2$,
a plating bath fluid with an Fe$^{++}$ ion concentration of about 1.1 – 1.7 g/l, an Ni$^{++}$ ion concentration of about 7 – 37 g/l, and a pH of about 1 – 3.6,
and maintaining said fluid at a temperature of 20° – 35° C,
wherein required Fe$^{++}$ ion concentration required to produce said films with 20% iron ± 1% is an inverse function of circulation of bath fluid across said substrate.

20. An electroplating method in accordance with claim 19 including
cell means for containing a plating bath fluid, an anode, and a cathode including said substrate to be plated with said nickel-iron film,
said cell including means for holding said cathode with the surface to be plated facing the anode of said cell,
an inlet to said cell aligned with the surface of said cathode whereby said inlet is adapted to pass said plating bath fluid directly onto the surface of said cathode,
a reservoir for said plating bath fluid having an outlet connected by conduit means to said inlet, means for pumping fluid up from said reservoir into said inlet via said conduit means,
an outlet from said cell for carrying said plating bath fluid into said reservoir,
a chemical sensor for producing an electrical signal as a function of a chemical concentration present in said system, and
a reagent dispenser for automatically dispensing at least one reagent including Fe$^{++}$ ions through a valve into said reservoir in response to said signal from said sensor.

21. A method in accordance with claim 20 wherein said bath has a nickel-iron ratio of about 10:1 to about 20:1.

22. A method in accordance with claim 20 wherein said cell includes a mixer for providing agitation without substantial turbulence.

23. A method in accordance with claim 20 wherein said chemical sensor comprises a pH sensor, and said reagent dispenser dispenses acid and Fe$^{++}$ ions.

24. A method in accordance with claim 20 wherein said reservoir includes a temperature sensor, a thermostatic control, and heating means for automatically maintaining the temperature of said plating bath.

25. A nickel-iron electroplating system including
cell means for containing a plating bath fluid, an anode, and a cathode to be plated with a nickel-iron alloy comprising a constant percentage of iron,
said cell including first and second vertical end walls,
said cell including means for holding a wafer to be plated at the cathode of said cell with the surface to be plated supported facing the anode of said cell,
a reciprocable mixer for agitation without substantial turbulence, supported by bearing means for providing longitudinal stirring action by reciprocation between said end walls cyclically, said mixer including a pair of confronting transverse blocks having a substantial slot therebetween and each having a symmetrical wedge shape with substantial opening between said blocks, said blocks having sharp edges facing the directions towards which said blade is adapted to reciprocate,
an inlet to said cell in one of said end walls aligned with the surface of said cathode whereby said inlet is adapted to pass said plating bath fluid directly onto the surface of the cathode and through said slot,
a reservoir for said plating bath fluid having an outlet connected by conduit means to said inlet, means for pumping said plating bath fluid up from said reservoir into said inlet via said conduit means,
an outlet from said cell at an upper portion thereof high above the base of said cell having second conduit means for carrying said plating bath fluid into said reservoir,
a thermostatic control, a temperature sensor and heating means connected to said reservoir for maintaining said reservoir substantially at 25° C,
a pH sensor and a dilute acid and an Fe$^{++}$ ion dispenser for dispensing said acid and said Fe$^{++}$ ion through a valve into said reservoir, and stirring means in said reservoir for maintaining a uniform temperature, and uniform values of pH, and Fe$^{++}$ ion concentration and related conditions.

26. A method of electroplating nickel-iron alloys of 20% iron ± 1% including a plating bath solution of Ni$^{++}$ ions and Fe$^{++}$ ions,
maintaining a substantially constant ratio of Ni$^{++}$ ions and Fe$^{++}$ ions near the cathode of said system, said bath having a relatively low slope curve of weight percent of Fe in the film to current density, whereby a several percent change in current density will yield a deviation in Fe composition less than 1%.

* * * * *